J. A. STEINMETZ.
METHOD OF NAVIGATING AIRCRAFT.
APPLICATION FILED NOV. 1, 1918.
1,340,573.
Patented May 18, 1920.
3 SHEETS—SHEET 1.
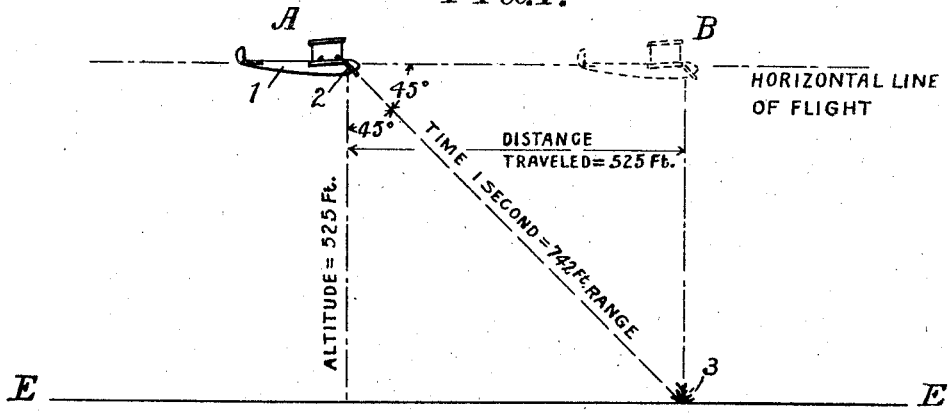
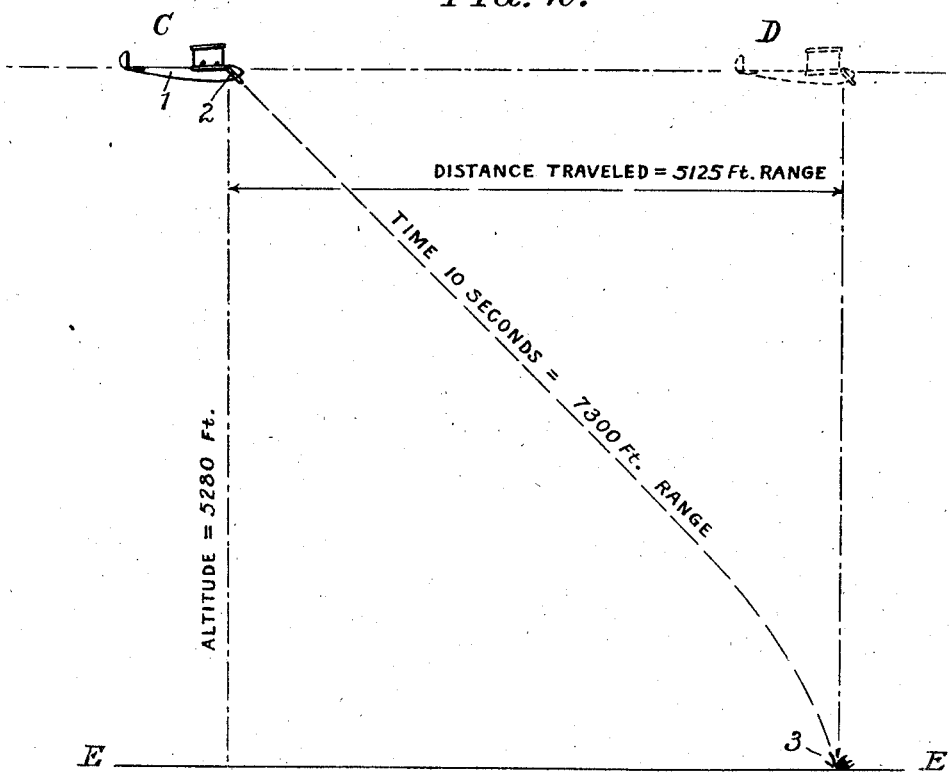
Inventor:
Joseph A. Steinmetz
By his Attorney
F. DeWitt Goodwin

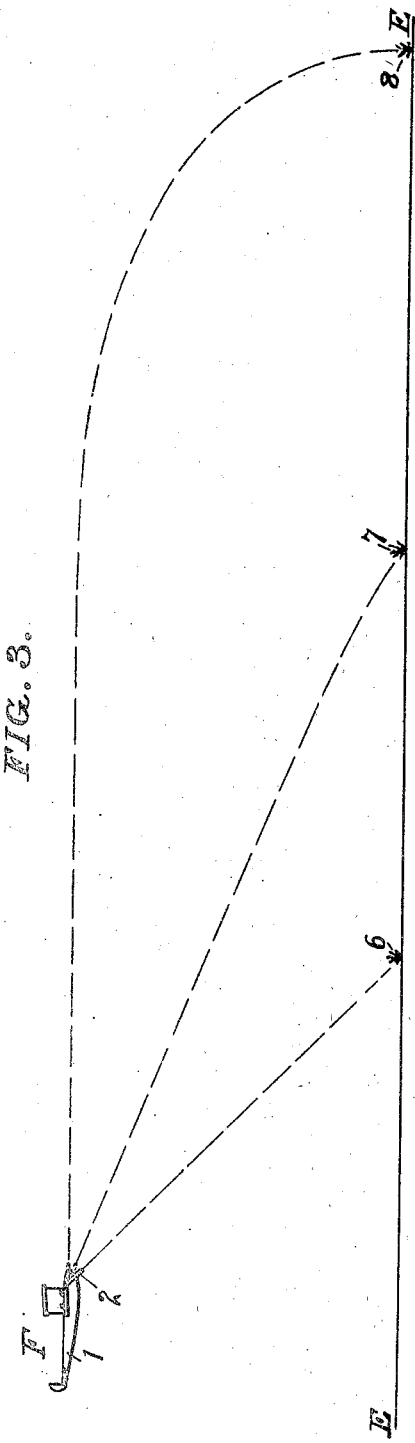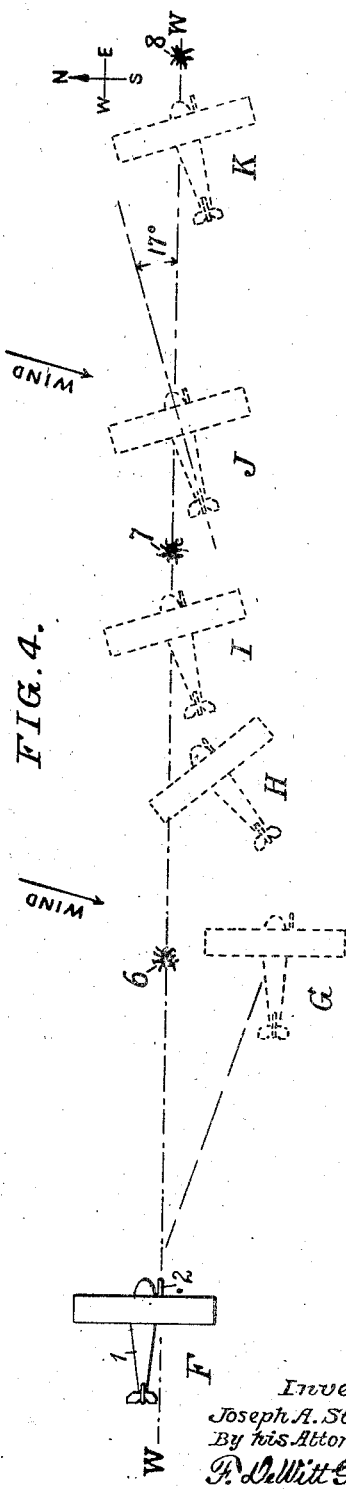

J. A. STEINMETZ.
METHOD OF NAVIGATING AIRCRAFT.
APPLICATION FILED NOV. 1, 1918.

1,340,573.

Patented May 18, 1920.

FIG. 5.

CHART FOR 45° ANGLE

| TIME IN SECONDS | RANGE IN FEET | ALTITUDE IN FEET | DISTANCE TRAVELED IN FEET |
|---|---|---|---|
| 1 | 742 | 525 | 525 |
| 1½ | 1,109 | 787 | 787 |
| 2 | 1,552 | 1,050 | 1,050 |
| 2½ | 1,873 | 1,325 | 1,325 |
| 3 | 2,262 | 1,600 | 1,600 |
| 4 | 2,970 | 2,100 | 2,100 |
| 5 | 3,741 | 2,650 | 2,650 |
| 6 | 4,450 | 3,150 | 3,150 |
| 7 | 5,224 | 3,700 | 3,685 |
| 8 | 5,900 | 4,200 | 4,150 |
| 9 | 6,600 | 4,750 | 4,675 |
| 10 | 7,300 | 5,280 ONE MILE | 5,125 |
| 15 | 10,800 | 7,900 | 7,500 |
| 20 | 14,500 | 10,560 TWO MILES | 9,500 |
| 25 | 17,500 | 13,200 | 11,600 |
| 30 | 20,500 | 15,850 | 13,000 |
| 35 | 23,000 | 18,480 | 13,200 = 2½ MILES |
| 40 | 25,000 | 21,120 FOUR MILES | 13,200 = 2½ MILES |

Inventor:
Joseph A. Steinmetz
By his Attorney
F. DeWitt Goodwin

UNITED STATES PATENT OFFICE.

JOSEPH A. STEINMETZ, OF PHILADELPHIA, PENNSYLVANIA.

METHOD OF NAVIGATING AIRCRAFT.

1,340,573.    Specification of Letters Patent.    Patented May 18, 1920.

Application filed November 1, 1918. Serial No. 260,647.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in Methods of Navigating Aircraft, of which the following is a specification.

My invention relates to a method of navigating aircraft and particularly relates to the method of determining the speed an aircraft is traveling over land or sea; of determining the altitude of the aircraft and also of determining the sidewise drift of the aircraft due to wind pressure when traveling across the wind. Heretofore with an aircraft traveling over land or sea, where there are no known land marks or buoys, it was impossible to ascertain accurately the speed of travel, due to the influence of plus or minus wind currents effecting the flight and also the sidewise drift from the desired course of flight.

The object of my invention is to provide a method of navigating aircraft, by the use of marking signals, in the form of smoke bombs or luminous flare lights for night travel, which are projected from the aircraft, preferably by means of a gun, toward the ground or surface of the sea, at a given angle in relation to the horizontal line of flight and in advance of the aircraft; a further step in the method is in timing the interval between the instant of firing the gun and the instant of the striking of the projectile or marking signal on the ground or surface of the sea. From the time, thus ascertained, of the flight of the projectile, which is of known ballistics, and of known trajectory, the distance covered by the projectile may be calculated or ascertained from a chart or table prepared for that purpose; a still further step in the method is in providing a card or chart from which may be ascertained the altitude of the aircraft at the time of firing the projectile and also the distance in advance of the aircraft at which the projectile or marking signal strikes the ground or sea when projected from the aircraft at a given angle. Thus the navigator may fire the gun at a certain angle and time the flight of the projectile; then by referring to the chart for the angle corresponding to the angle at which the gun was fired and finding the line on the chart opposite to the number of seconds corresponding to the number of seconds consumed in the flight of the projectile, the chart will show the length of the trajectory or the hypotenuse of the triangle, the length of the perpendicular of the triangle or the altitude of the aircraft, and it will also show the length of the base of the triangle or the distance over the ground or surface of the sea between the position of the aircraft at the time of the firing of the gun and the position of the aircraft when it is in a vertical position over the place where the projectile or marking signal struck the surface of the ground or sea; by keeping a record of the time elapsed from the firing of the gun until said vertical position over the spot struck by the projectile is reached the aviator will know that he has traveled a known distance, in a known time, from which he can calculate the speed at which he is traveling; and a still further step in the method is in projecting two or more bombs, or marking signals, in a straight line upon the surface of the ground or sea to be used as range markers which will show the amount of drift or leeway the aircraft is making, away from its desired course and from which marking signals the aviator may correct his course by holding the bow of the aircraft off the desired line of flight and into the wind sufficiently until he finds that the aircraft is moving in the desired line of travel, as shown by the marking signals. The compass will then show the aviator how many points into the wind he must steer to maintain his desired course and by repeating the firing of the marking signals the course can be corrected as often as the variations in the side wind pressures may affect the line of flight of the aircraft.

Referring to the accompanying drawings,

Figure 1, is a view in elevation of an aircraft and representing diagrammatically the vertical plane between the horizontal line of flight and the surface of the ground or sea;

Fig. 2, is a view similar to Fig. 1, showing the aircraft traveling at a greater height;

Fig. 3, is a view similar to Fig. 1, showing how two or more bombs or marking signals may be placed in a straight line from which the amount of leeway or side drift of the aircraft may be ascertained;

Fig. 4, is a plan view of Fig. 3,

Fig. 5, is a face view of the table or chart showing the range, altitude and distance traveled corresponding to the length of time in seconds for various trajectories of the projectile or marking signal.

Throughout the drawings similar reference characters refer to like parts. This distances specified are to be considered for purposes of illustration, as they are only approximately correct. A standard may be established from actual tests by firing the gun from a known height over a measured course and the result of such tests are to be embodied in the chart or form a basis for the calculations.

Referring to Fig. 1, of the drawings the aircraft 1 is assumed to be traveling over an area without any known object in view and it is desired to ascertain the speed at which the aircraft is traveling and also its altitude; the aircraft, is brought to a horizontal line of flight, which may be readily done by the assistance of the clinometer. A gun 2 is mounted upon the aircraft in such a manner that it may be aimed at any desired angle in relation to the horizontal line and in a vertical plane parallel with the line of flight. If the gun 2 be aimed at an angle of forty-five degrees below the horizontal line and in the direction of the line of flight, a projectile 3 of known ballistics, fired from the gun and the time of flight of the projectile ascertained by the aid of a split second stop watch, the range, or trajectory of the projectile may be calculated, or ascertained from the chart shown in Fig. 5.

In addition to the above mentioned record of the elapsed time between the firing of the gun and the striking of the marking signal 3 upon the line E—E, representing the surface of the ground or sea, a second record is made of the time between the firing of the gun and the moment the aircraft is directly over the projectile, or marking signal 3, on the surface of the ground or sea.

The air navigator now refers to the chart for the forty-five degree angle, which is the angle at which the gun was fired. If the elapsed time from the firing of the gun until the marking signal 3 reached the end of its flight, was one second; in the first column of the chart will be found tabulated one second under the heading "Time". On the same line of the chart under heading "Altitude" in column three, will be found five hundred twenty-five feet, which will be the altitude of the aircraft when one second of time was required for the flight of the marking signal. In the fourth column under "Distance traveled" will be found five hundred twenty-five feet, which will be the distance traveled by the aircraft from position A, Fig. 1, where the aircraft was when the marking signal was fired from the gun, to position B directly over the marking signal on the surface of the ground or sea. By referring to his record the navigator finds that the elapsed time for this distance A to B, Fig. 1, was six seconds and knowing the distance to be five hundred twenty-five feet he can readily calculate that he is traveling at the rate of nearly sixty miles per hour.

If the gun were fired when the aircraft is in position C, Fig. 2, and the time required for the marking signal 3 to reach the surface of the ground or sea was ten seconds, by referring to the chart, it will be found that opposite to "Ten seconds" will be given the altitude, fifty-two hundred eighty feet, and the distance traveled to be fifty-one hundred twenty-five meet. Knowing that the time consumed in traveling fifty-one hundred twenty-five feet, or from position C to position D Fig. 2, to be, say fifty-eight and one-fifth seconds, he will know that he is maintaining a speed of sixty miles per hour. Should the time for the distance be greater than that above mentioned, as for instance two and one-half minutes, then the rate of speed will only be about twenty-three miles per hour. A relatively shorter time for the distance will show a greater speed per hour. The aviator can thus readily ascertain the rate of speed he is traveling when under favorable or unfavorable wind conditions and also the altitude at which he is flying.

By referring to Fig. 1, it will be seen that a right triangle A—B—3 is formed by the firing of the gun at an angle of forty-five degrees. The trajectory forms the hypotenuse of the triangle and if its length be known and the angle A is forty-five degrees, the length of the two other sides of the triangle may be found geometrically. When the gun is fired at other than a forty-five degree angle with the horizontal line of flight the sine of the angle will give the altitude and the cosine will give the distance traveled. By having a chart for each angle at which the gun is to be fired in relation to the horizontal line of flight, the desired results may be tabulated so that they can be quickly ascertained.

Referring to Figs. 3 and 4, it will be seen that the desired course of travel may be maintained regardless of unfavorable wind conditions. When the aircraft is in the position F, a plurality of marking signals 6—7 and 8 are fired in rapid succession at different angles, in advance of the aircraft and parallel with the line of flight W—W Fig. 4. The said marking signals 6—7 and 8 may be seen on the surface of the ground or sea, represented by the line E—E, Fig. 3. If the aircraft is blown to one side of the line of marking signals, into position G, shown in the plan view Fig. 4, the navigator will know that he is drifting out of his desired course W—W.

If the desired course is in an eastwardly direction and the aircraft is heading east when the gun fires the marking signals 6—7 and 8, the line W—W extending through said marking signals will indicate the desired course. When the aviator finds that he has drifted into position G, without changing his course in relation to his compass, he can at once correct his course by steering over the line formed by the said marking signals and when he has reached the position J, Fig. 4, he will know that it is necessary to head the aircraft a certain number of degrees, as shown by the compass, toward the wind, to maintain his line of travel in an eastwardly direction.

In Fig. 4, the aircraft when in position J is shown heading seventeen degrees north of east and is moving in the line of the marking signals into position K. This deviation being found necessary to maintain an eastwardly course, due to the side wind pressure. By repeated corrections of the course at frequent intervals in this manner, or when the wind conditions change, a correct course may be maintained. Instead of forming the line of marking signals by projecting two or more marking signals in rapid succession as shown in Figs. 3 and 4, one marking signal may be fired in advance of the aircraft and when the latter is directly over the position of the marking signal, another marking signal may be fired still farther in advance and in the same direction, as shown by the compass and in this way a series of marking signals may be formed and utilized for regulating the course of the aircraft. The gun used upon the aircraft for firing the bombs or marking signals, may be of any desired type and the bombs are of such character that they will give off smoke which can be readily seen in day time and a flare which can be seen at night.

By shooting the projectiles or marking signals from a gun they will travel with great rapidity and force and therefore will not be affected by the wind to any material extent.

It will be understood that under unfavorable wind conditions it will be necessary to make repeated applications of the method to correct the course of travel in a given direction, due to the fact that the line W—W, Fig. 4, formed by the signals fired from the aircraft will only form an approximately straight line, if at the moment of projection of the signals, there are two forces acting thereon; the first being due to the velocity of the aircraft in the direction of drift, and the second being the projecting force which impels the signal in the direction of the course of the aircraft, in which case the signals will lie in a line representing the resultant of the two forces and not in a perfectly straight line representing the direction of the projection from the gun.

These conditions have all been previously investigated by the applicant and he finds that in a moderate side wind the motion or force caused by side drift is negligible in the very short interval of time required to fire the signals and that the resultant of the forces will not be of any great consequence, and that in a heavy cross wind the pilot always heads the aircraft into the wind to reduce the side drift when he desires to travel in a given direction under an unfavorable wind. When thus traveling sidewise due to the cross wind a great amount of the side drift is overcome. In some cases the side drift is more than overcome as the pilot may steer the aircraft too far into the wind, causing the aircraft to move to windward of the desired line of travel. Therefore even in a heavy cross wind the force due to side drift would be nearly eliminated and the line formed by the signals fired in rapid succession would not vary greatly from a straight line. Furthermore if the first set of signals projected do not fall in a straight line, they will at least help the pilot to correct his course and bring the aircraft into a position from which may be fired a second set of signals which will fall in an approximately straight line.

Having thus described my invention I claim and desire to secure by Letters Patent.

1. The method of navigating aircraft comprising, the projecting of a marking signal, at a predetermined angle to the horizontal and at a predetermined velocity, from the aircraft to the surface of the ground or sea in advance of the aircraft, and by timing the interval between the instant the marking signal leaves the aircraft and the instant the aircraft arrives at a point directly over the location of the signal upon the surface of the ground or sea, whereby the speed of the aircraft may be ascertained.

2. The method of navigating aircraft comprising, the projecting of a marking signal at a predetermined angle to the horizontal and at a predetermined velocity from the aircraft to the surface of the ground or sea, in advance of the air craft, timing the interval between the instant the marking signal leaves the aircraft and the instant the marking signal strikes the surface of the ground or sea to obtain the length of the trajectory of the marking signal, and also timing the interval between the instant the marking signal leaves the aircraft and the instant the aircraft arrives at a point directly over the location of the marking signal whereby the altitude and speed of the aircraft may be ascertained.

3. The method of navigating aircraft, comprising the projecting of a plurality of signals in advance of the aircraft in the same vertical plane and at different angles in relation to the horizontal line of flight, so that the signals will strike the surface of the ground or sea at different distances from the aircraft and in a straight line approximately in the plane of projection of the signals, and then regulating the course of travel of the aircraft by the said straight line.

In testimony whereof I affix my signature in the presence of a witness.

JOSEPH A. STEINMETZ.

Witness:
FREDERICK W. BAUER.